United States Patent Office 3,692,676
Patented Sept. 19, 1972

3,692,676
METHOD OF FRICTION LOSS REDUCTION IN OLEAGINOUS FLUIDS FLOWING THROUGH CONDUITS
John D. Culter, Rolla, Mo., and Gifford G. McClaflin, Ponca City, Okla., assignors to Continental Oil Company, Ponca City, Okla.
No Drawing. Filed Dec. 22, 1969, Ser. No. 887,375
Int. Cl. E21b 43/25
U.S. Cl. 252—8.55 R     3 Claims

ABSTRACT OF THE DISCLOSURE

A method of reducing the friction loss normally occurring when oleaginous fluids flow through conduits by adding to the oleaginous fluid a minor amount of a very high molecular weight polyolefin.

BACKGROUND OF THE INVENTION

(1) Field of the invention

This invention relates to a method of decreasing friction loss in non-aqueous, petroliferous or oleaginous liquids flowing through conduits. More particularly, it relates to an additive for such liquids which increases the ease with which they may be moved through conduits.

(2) Description of the prior art

Energy must be supplied to move a liquid from one location to another via a conduit or pipe. When a liquid is pumped through a conduit a pressure is developed on the positive or discharge side of the pump. The pressure in the conduit immediately adjacent the discharge side of the pump will be greater than the pressure farther along the conduit away from the pump. This difference in pressure, often referred to as the "pressure drop," "friction loss," or "drag," is generally more pronounced the faster the liquid flows. In many industrial operations where a large volume of liquid is moved rapidly, such as in the hydraulic fracturing of subterranean formations penetrated by a well and the transportation of liquids long distances through pipelines, a large amount of energy is expended in moving the liquid. If the pressue drop could be reduced, either larger volumes of liquid could be moved with the same pump capacity or the pressure and/or energy requirements for moving a given liquid volume reduced. Additives are known which reduce the friction loss or drag of hydrocarbon liquids flowing through pipes. Among such additives are high molecular weight polyisobutylene resins. However, polyisobutylene and other previously known additives have the disadvantage of being highly shear degradable, i.e., when the hydrocarbon liquid containing the additive is subjected to a shearing action, such as being passed through a pump, the effectiveness of the additive in reducing friction loss is sharply decreased. In hydraulic fracturing operations at least one pump must be employed to inject the fracturing fluid down the conduit and out into the subterranean formation. In pipelining operations the pipelined liquid often passes through several booster pumps between its point of origin and its ultimate designation. Shear degradation can also occur when a pressurized liquid is passed through an orifice, nozzle, or adjustable valve to reduce the pressure.

It is an object of the present invention to provide an effective friction loss reduction additive for non-aqueous liquids. It is a further object to provide such an additive which is resistant to shear degradation. It is a still further object to provide such an additive which is effective at a low concentration.

SUMMARY OF THE INVENTION

The present invention is a method for reducing the friction loss of non-aqueous oleaginous and petroliferous liquids flowing through conduits comprising adding to said liquids a minor amount of a very high molecular weight polymer made from α-olefin monomers ranging from hexene to eicosene or mixtures thereof.

DESCRIPTION OF THE PREFERRED EMBODIMENT

The non-aqueous liquids in which the additive of this invention is effective include oleaginous or petroliferous liquids as well as emulsions, suspensions, and dispersions thereof. For example crude oil, refined petroleum products such as kerosene, pale oil, diesel oil, fuel oil, asphalt, etc., water-in-oil emulsions, and the like. Where the non-aqueous liquid is a hydraulic fracturing fluid, it may also contain solid particulate matter such as sand as a propping agent, a fluid loss control additive and other materials commonly added to fracturing fluids.

A large number of catalyst systems are known for polymerizing α-olefins. In the so-called Ziegler process α-olefins are polymerized at relatively low temperatures and atmospheric pressure by contacting the α-olefin with a catalyst comprising a mixture of a compound of a metal of Groups IV–B, V–B, VI–B, or VIII of the Periodic Table of the elements, found at p. B–3 of the Handbook of Chemistry and Physics, 50th ed., edited by Robert C. Weast, published by the Chemical Rubber Co., Library of Congress Card No. 13–11056, in combination with an organometallic compound of an alkali metal, alkaline earth metal, zinc, earth metal, or rare earth metal. Among the large number of possible compounds and combinations especially useful have been the titanium halides admixed with an organoaluminum compound.

The usual procedure for carrying out such a process is to mix the two catalyst components in a hydrocarbon solvent and then pass the α-olefin monomer into the catalyst mixture at atmospheric or slightly elevated pressure and at room or slightly elevated temperature. When the two reactants come together the polymer forms.

It has been found that especially high molecular weight polymers, e.g., a molecular weight of from about 1 to 40 million, can be prepared by polymerizing α-olefin monomers having from 6 to 20 carbon atoms or mixtures thereof with Ziegler catalyst. Generally from about 5 to 500 parts per million polymer in the oleaginous liquid provides adequate drag reduction.

An especially effective additive can be prepared by polymerizing an α-olefin monomer in a hydrocarbon solvent with a Ziegler catalyst, deactivating the catalyst, stabilizing the resulting polymer solution wih a polyolefin sabilizer and the polymer left in solution rather than being precipitated and separated as a solid. A solution referred to as "polymer solution A" was made in this manner using a mixture of α-olefin monomers having from 6 to 10 carbon atoms, a naphtha solvent, a catalyst comprising a mixture of aluminum diethyl chloride and aluminum activated titanium trichloride and isopropyl alcohol as the deactivator to form a solution containing 10 weight percent polymer. The polymer has an inherent viscosity of 3.6.

A series of polymers were prepared and tested for effectiveness as drag reduction additives. The polymers were prepared by adding the indicated amounts of monomer and two catalyst components to 340 grams n-heptane polymerization solvent in a 980 milliliter dry argon-flushed bottle. The bottle was capped, placed in a nitrogen-purged rotating bottle polymerizer and rotated end over end in air at room temperature for 24 hours. The catalyst in the resulting polymerized mass was deactivated with isopropyl alcohol. Additional isopropyl alcohol was added to precipitate the polymer. The solid polymer product was separated off and blended first with a 50/50 (by volume) mixture of isopropyl alcohol and water, next with a 50/50 mixture of methyl alcohol and water and finally with methyl alcohol alone. Following each blending the liquid was removed by decantation. A polyolefin stabilizer was added. The semi-dry polymer was dried in a 60 to 65° C. vacuum oven for 18 to 24 hours.

For each polymer the inherent viscosity, $\eta_{inh}$, in cetane at 100° F. was determined. The approximate molecular weight was then calculated using the Kuhn-Mark-Houwink equation, $\eta_{inh} = KM^a$ where $K = 2.1 \times 10^{-4}$ and $a = 0.61$. For example for an $\eta_{inh}$ of 1, 2, 4, 6, and 8, the calculated molecular weights are $1 \times 10^6$, $3 \times 10^6$, $1.05 \times 10^7$, $2.04 \times 10^7$ and $3.31 \times 10^7$ respectively.

Drag reduction measurements were made using a constant speed pipe viscometer comprising: an Ingersoll-Rand 3,455 r.p.m., ¾ MCS size, 20 gallon per minute centrifugal pump; a seven foot long test section of 0.305 inch inside diameter stainless steel tubing; two pressure gauges ranging from 30 ounces per square inch to 30 pounds per square inch pressure, one positioned two feet from the tube entrance and the other positioned one foot from the tube outlet; 100 pound grease buckets for volume and weighing tanks and scales for determining the mass flow rate. A flow rate of approximately 7 gallons per minute was used, resulting in a velocity of 30.5 feet per second and a Reynolds number of approximately 20,000 with diesel oil test fluid. The measurements were carried out by adding 2½ gallons of diesel oil to one of the tanks of the pipe viscometer, measuring the pressure drop of the diesel oil, i.e., the difference in the pressure as shown on the two gauges, and then measuring the pressure drop as the polymer was added. The polymers used were first dissolved in either diesel oil or Decalin at a concentration of 1 percent. The pressure drop measurements were taken 10 minutes after the polymer solution was added. The percent drag reduction was calculated as follows:

Percent drag reduction
$$= \frac{\text{(Pressure drop of diesel oil)} - \text{(Pressure drop of polymer solution)}}{\text{(Pressure drop of diesel oil)}} \times 100$$

It was found that excellent drag reduction could be obtained using polymers made from α-olefin monomers having from 6 to 20 carbon atoms, and a molecular weight range of from about 1 to about 40 million.

PIPELINE EXAMPLE

The effectiveness of low concentrations of the polymer in reducing the drag in a pipeline was determined using a 28.3 mile long segment of an 8.249 inch inside diameter Oklahoma crude oil pipeline having booster pumps at the beginning and end of the segment. The line was tapped for pressure measurement 8 miles and 19 miles from the origin of the segment. The friction loss between the two pressure taps were determined by flowing Oklahoma crude oil through the line at a rate of 27,800 barrels oil per day. A 5 percent (by weight) solution of polymer solution A in a solvent of 50 parts (by weight) naphtha and 50 parts diesel oil was injected into the discharge manifold of the booster pump at the beginning of the test segment at a rate sufficient to provide a concentration of 21 parts per million polymer in the crude oil. When the line was filled with the polymer-crude oil solution the friction loss was determined by reading the pressure at the two pressure taps. A comparison with the friction loss when crude oil alone was in the line together with the increased volume which could be pumped when the polymer was also present in the line showed an overall drag reduction of 25 percent. A similar test using a concentration of 10 parts per million polymer gave a drag reduction of 18 percent. A similar test using a concentration of 5 parts per million polymer gave a drag reduction of 12 percent.

WELL EXAMPLE

An oil-producing well in Lea County, N. Mex., was plugged back to a total depth of 6,100 feet and equipped with 5½ inch diameter 14 pound casing. The casing was perforated with 70 holes over the interval from 5,898 to 5,980 feet. Three-inch diameter EUE tubing extended to just above the perforations and was packed off at 5,788 feet. The well was hydraulically fractured at a rate of from 17 to 22 barrels per minute pumped down the tubing using as the fracturing fluid lease crude oil containing from ½ to 3 pounds per 1,000 gallons of 20 to 40 mesh sand propping agent. To three portions of the fracturing fluid was added polymer solution A in the amount of 3, 8, and 10 gallons per 1,000 gallons fracturing fluid. The drag reduction caused by the polymer was determined by comparing the measured frictional pressure with the calculated Newtonian frictional pressure. The drag reduction varied from about 10 percent to a little greater than 18 percent during the treatment. Thus, it was easier to pump the fracturing fluid containing the polymer solution than it was to pump the fracturing fluid alone.

What is claimed is:

1. A process for reducing the friction loss in hydrocarbon liquids flowing through conduits at high velocity comprising adding to said hydrocarbon liquids from 5 to 500 parts per million of homopolymers of alpha-olefin monomers having from 6 to 20 carbon atoms or copolymers

CATALYST

| | Number of carbon atoms in α-olefin monomer | Moles of— | | | Mole ratio, monomer/ Al/Te | Yield, percent | $\eta$ ink | Approx. molecular weight | Drag reduction, percent |
|---|---|---|---|---|---|---|---|---|---|
| | | α-Olefin monomer | Aluminum diethyl-chloride | AA titanium trichloride | | | | | |
| Example: | | | | | | | | | |
| 1 | 6 | 2.64 | 0.072 | 0.036 | 73/2/1 | 82.8 | 1.71 | $2 \times 10^6$ | 6.1 |
| 2 | 8 | 2.64 | 0.072 | 0.036 | 73/2/2 | 91.1 | 2.36 | $4 \times 10^6$ | 29.4 |
| 3 | 10 | 1.32 | 0.036 | 0.018 | 73/2/1 | 93.7 | 3.56 | $6.6 \times 10^6$ | 27.4 |
| 4 | 12 | 1.32 | 0.036 | 0.018 | 73/2/1 | 83.3 | 3.09 | $6 \times 10^6$ | 20.6 |
| 10 | 20 | 1.00 | 0.028 | 0.014 | 71/2/1 | 90.0 | 3.27 | $6.3 \times 10^6$ | 49.7 |
| 5 | 6–10 | 1.32 | 0.036 | 0.018 | 73/2/1 | 89.7 | 3.62 | $6.6 \times 10^6$ | 30.2 |
| 6 | 8–10 | 1.32 | 0.036 | 0.018 | 73/2/1 | (¹) | 2.98 | $5.9 \times 10^6$ | 36.8 |
| 7 | 8–10 | 0.70 | 0.006 | 0.004 | 233/2/1 | 87.9 | 7.02 | $2.7 \times 10^7$ | 63.5 |
| 8 | 8–10 | 4.76 | 0.045 | 0.023 | 207/2/1 | 93.2 | 6.35 | $2.3 \times 10^7$ | 53.5 |
| 9 | 12–14 | 0.50 | 0.007 | 0.003 | 167/2.3/1 | (¹) | 7.66 | $3.0 \times 10^6$ | 49.7 |

¹ Not measured.

consisting of polymerized alpha-olefin monomers having from 6 to 20 carbon atoms.

2. A process for reducing the friction loss in hydrocarbon liquid base hydraulic fracturing fluid during the injection thereof into a subterranean formation via a well penetrating such subterranean formation comprising adding to such fracturing fluid from 5 to 500 parts per million of homopolymers of alpha-olefin monomers having from 6 to 20 carbon atoms or copolymers consisting of polymerized alpha-olefin monomers having from 6 to 20 carbon atoms, said polymers having a molecular weight of from 1 to 40 million.

3. A process for reducing the friction loss in hydrocarbon liquid flowing through a pipeline comprising adding to such hydrocarbon liquid from 5 to 500 parts per million of homopolymers of alpha-olefin monomers having from 6 to 20 carbon atoms or copolymers consisting of polymerized alpha-olefin monomers having from 6 to 20 carbon atoms, said polymers having a molecular weight of from 1 to 40 million.

References Cited
UNITED STATES PATENTS

| | | | |
|---|---|---|---|
| 3,466,242 | 9/1969 | McClaflin | 252—8.55 R |
| 3,351,079 | 11/1967 | Gibson | 137—13 |
| 3,215,154 | 11/1965 | White et al. | 252—8.55 R |
| 3,434,485 | 3/1969 | Lummus | 252—8.55 R |
| 3,493,000 | 2/1970 | Canevari et al. | 137—13 |

HERBERT B. GUYNN, Primary Examiner

U.S. Cl. X.R.

137—13; 166—308